(12) United States Patent
Kim et al.

(10) Patent No.: US 9,148,692 B2
(45) Date of Patent: *Sep. 29, 2015

(54) DIGITAL TELEVISION SIGNAL, DIGITAL TELEVISION RECEIVER, AND METHOD OF PROCESSING DIGITAL TELEVISION SIGNAL

(71) Applicant: LG Electronics Inc., Seoul (KR)

(72) Inventors: Jin Pil Kim, Seoul (KR); Kyung Mee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,787

(22) Filed: Jan. 26, 2015

(65) Prior Publication Data

US 2015/0150056 A1 May 28, 2015

Related U.S. Application Data

(63) Continuation of application No. 14/498,858, filed on Sep. 26, 2014, which is a continuation of application No. 14/311,131, filed on Jun. 20, 2014, now Pat. No. 8,935,730, which is a continuation of application No.

(Continued)

(30) Foreign Application Priority Data

Nov. 11, 2005 (KR) ........................ 10-2005-0108273

(51) Int. Cl.
*G06F 3/00* (2006.01)
*G06F 13/00* (2006.01)

(Continued)

(52) U.S. Cl.
CPC ......... *H04N 21/4345* (2013.01); *H04N 21/235* (2013.01); *H04N 21/2362* (2013.01);
(Continued)

(58) Field of Classification Search
USPC ............................................. 725/54, 131, 139
See application file for complete search history.

(56) References Cited

U.S. PATENT DOCUMENTS 6,091,772 A  7/2000  Anderson et al.
6,115,074 A  9/2000  Ozkan et al.
(Continued)

FOREIGN PATENT DOCUMENTS

KR  10-2004-0074342 A  8/2004

OTHER PUBLICATIONS

"Program and System Information Protocol for Terrestrial Broadcast and Cable", ATSC Standard of Dec. 23, 1997, prepared by the United States Advanced Television Systems Committee (ATSC) Doc. A/65.

*Primary Examiner* — Kunal Langhnoja
(74) *Attorney, Agent, or Firm* — Birch, Stewart, Kolasch & Birch, LLP

(57) ABSTRACT

A method of processing a digital television (DTV) signal in a DTV receiver, the method includes receiving a digital television signal including a plurality of extended text table (ETT) instances that appear in transport stream packets with common PID values, the ETT instances having common table ID values, each ETT instance comprising a section header and a message body, the section header containing a table identification (ID) extension field that serves to establish uniqueness of each ETT instance, the message body containing an extended text message (ETM) which provides detailed descriptions of a virtual channel or an event associated with each ETT instance, wherein the section header further contains a current next indicator field and a last section number field indicating a last section number, demodulating the digital television signal and identifying at least one pertinent ETT instance from the plurality of ETT instances.

20 Claims, 10 Drawing Sheets

| Syntax | No. of Bits | Format |
|---|---|---|
| Extended_text_table_section () { | | |
|   table_id | 8 | 0xCC |
|   section_syntax_indicator | 1 | '1' |
|   private_indicator | 1 | '1' |
|   reserved | 2 | '11' |
|   section_length | 12 | uimsbf |
|   table_id_extension { | | |
|     ETM_location | 2 | uimsbf |
|     event_id | 14 | uimsbf |
|   } | | |
|   reserved | 2 | '11' |
|   version_number | 5 | uimsbf |
|   current_next_indicator | 1 | '1' |
|   section_number | 8 | 0x00 |
|   last_section_number | 8 | 0x00 |
|   protocol_version | 8 | uimsbf |
|   ETM_id | 32 | uimsbf |
|   extended_text_message() | var | |
|   CRC_32 | 32 | rpchof |
| } | | |

Related U.S. Application Data

13/840,869, filed on Mar. 15, 2013, now Pat. No. 8,799,960, which is a continuation of application No. 13/618,645, filed on Sep. 14, 2012, now Pat. No. 8,473,987, which is a continuation of application No. 13/157,142, filed on Jun. 9, 2011, now Pat. No. 8,347,336, which is a continuation of application No. 12/773,745, filed on May 4, 2010, now Pat. No. 7,984,470, which is a continuation of application No. 11/368,458, filed on Mar. 7, 2006, now Pat. No. 7,743,397, which is a continuation-in-part of application No. 11/062,429, filed on Feb. 23, 2005, now Pat. No. 7,246,365, which is a continuation of application No. 09/760,840, filed on Jan. 17, 2001, now Pat. No. 6,918,133.

(60) Provisional application No. 60/704,446, filed on Aug. 2, 2005.

(51) Int. Cl.

| | | |
|---|---|---|
| *H04N 5/445* | (2011.01) | |
| *H04N 21/434* | (2011.01) | |
| *H04N 21/84* | (2011.01) | |
| *H04N 21/482* | (2011.01) | |
| *H04N 21/435* | (2011.01) | |
| *H04N 21/2362* | (2011.01) | |
| *H04N 21/236* | (2011.01) | |
| *H04N 21/235* | (2011.01) | |
| *H04N 21/2668* | (2011.01) | |
| *H04N 21/431* | (2011.01) | |

(52) U.S. Cl.
CPC ... *H04N21/23605* (2013.01); *H04N 21/23614* (2013.01); *H04N 21/2668* (2013.01); *H04N 21/431* (2013.01); *H04N 21/435* (2013.01); *H04N 21/4348* (2013.01); *H04N 21/482* (2013.01); *H04N 21/84* (2013.01)

(56) References Cited

U.S. PATENT DOCUMENTS

| | | |
|---|---|---|
| 6,353,930 B1 | 3/2002 | Shimoji et al. |
| 6,510,555 B1 | 1/2003 | Tsurumoto |
| 6,604,243 B1 | 8/2003 | Freimann |
| 6,918,133 B2 | 7/2005 | Lee |
| 6,961,955 B1 | 11/2005 | Durden et al. |
| 7,246,365 B2 | 7/2007 | Lee et al. |

FIG. 1

| table_id | 8bits |
|---|---|
| section_syntax_indicator | 1bits |
| private_indicator | 1bits |
| reserved | 2bits |
| section_length | 12bits |
| table_id_extension | 16bits |
| reserved | 2bits |
| version_number | 5bits |
| current_next_indicator | 1bits |
| section_number | 8bits |
| last_section_number | 8bits |
| protocol_number | 8bits |
| actual_table_data | * |
| CRC_32 | 32bits |

FIG. 2

| Syntax | No. of Bits | Format |
|---|---|---|
| Extended_text_table_section () { | | |
|     table_id | 8 | 0xCC |
|     section_syntax_indicator | 1 | '1' |
|     private_indicator | 1 | '1' |
|     reserved | 2 | '11' |
|     section_length | 12 | uimsbf |
|     table_id_extension { | | |
|         source_id | 16 | uimsbf |
|     } | | |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     ETM_id | 32 | uimsbf |
|     extended_text_message() | var | |
|     CRC_32 | 32 | rpchof |
| } | | |

FIG. 3

| Syntax | No. of Bits | Format |
|---|---|---|
| Extended_text_table_section () { | | |
|     table_id | 8 | 0xCC |
|     section_syntax_indicator | 1 | '1' |
|     private_indicator | 1 | '1' |
|     reserved | 2 | '11' |
|     section_length | 12 | uimsbf |
|     table_id_extension { | | |
|         ETM_location | 2 | uimsbf |
|         event_id | 14 | uimsbf |
|     } | | |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     ETM_id | 32 | uimsbf |
|     extended_text_message() | var | |
|     CRC_32 | 32 | rpchof |
| } | | |

FIG. 6

| source_id_A | event_id_(A1~An) |
| source_id_B | event_id_(B1~Bn) |
| ⋮ | ⋮ |
| source_id_Z | event_id_(Z1~Zn) |

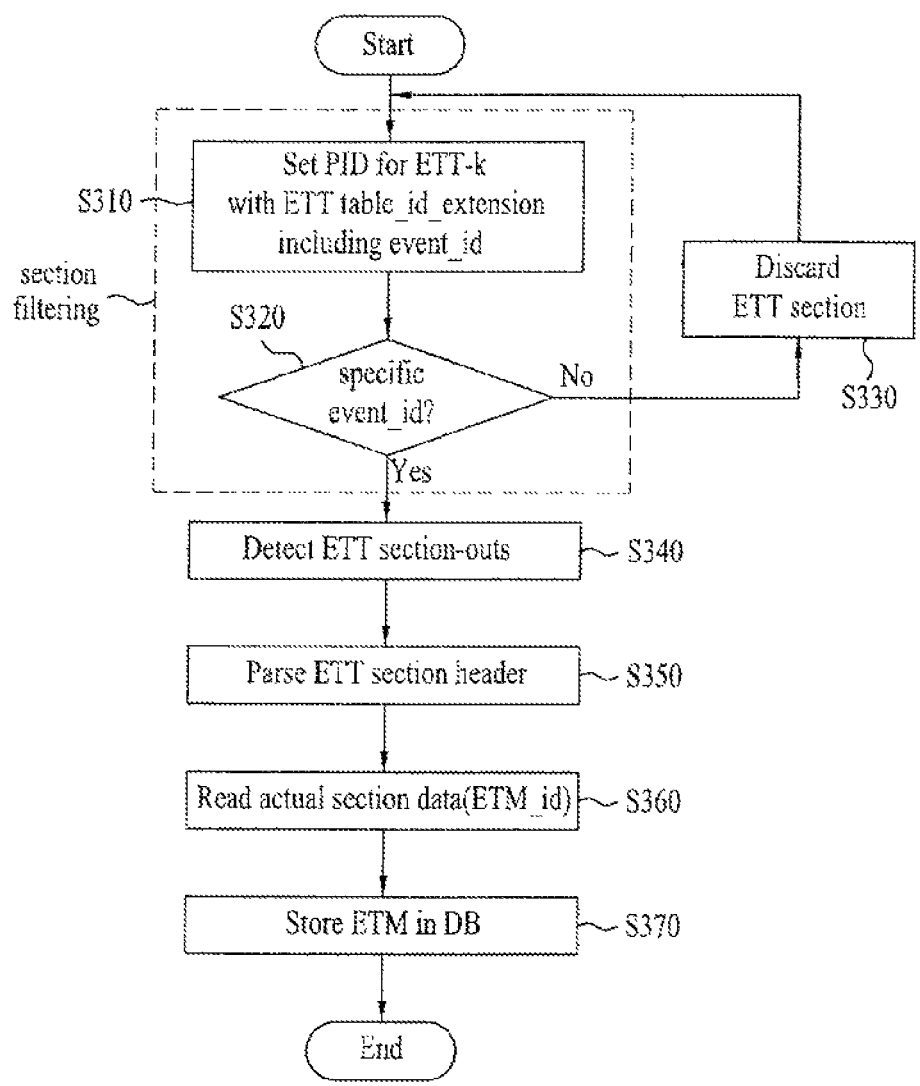

DIGITAL TELEVISION SIGNAL, DIGITAL TELEVISION RECEIVER, AND METHOD OF PROCESSING DIGITAL TELEVISION SIGNAL

This application is a Continuation of co-pending U.S. application Ser. No. 14/498,858 filed on Sep. 26, 2014, which is a Continuation of U.S. application Ser. No. 14/311,131 filed on Jun. 20, 2014 (now U.S. Pat. No. 8,935,730, issued on Jan. 13, 2015), which is a Continuation of U.S. patent application Ser. No. 13/840,869 filed on Mar. 15, 2013 (now U.S. Pat. No. 8,799,960, issued on Aug. 5, 2014), which is a Continuation of U.S. patent application Ser. No. 13/618,645 filed on Sep. 14, 2012 (now U.S. Pat. No. 8,473,987, issued on Jun. 25, 2013), which is a Continuation of U.S. patent application Ser. No. 13/157,142 filed on Jun. 9, 2011 (now U.S. Pat. No. 8,347,336, issued on Jan. 1, 2013), which is a Continuation of U.S. patent application Ser. No. 12/773,745 filed on May 4, 2010 (now U.S. Pat. No. 7,984,470, issued on Jul. 19, 2011), which is a Continuation of U.S. patent application Ser. No. 11/368,458, filed on Mar. 7, 2006 (now U.S. Pat. No. 7,743,397, issued on Jun. 22, 2010), which is a Continuation-In-Part of U.S. patent application Ser. No. 11/062,429, filed on Feb. 23, 2005 (now U.S. Pat. No. 7,246,365, issued on Jul. 17, 2007), which is a Continuation of U.S. patent application Ser. No. 09/760,840, filed on Jan. 17, 2001 (now U.S. Pat. No. 6,918,133, issued on Jul. 12, 2005).

The above-identified U.S. application Ser. No. 11/368,458 also claims the benefit of Korean Patent Application No. 10-2005-0108273, filed on Nov. 11, 2005, and also claims the benefit of U.S. Provisional Application No. 60/704,446, filed on Aug. 2, 2005.

The disclosures of each of the above referenced applications are incorporated by reference.

BACKGROUND OF THE INVENTION

1. Field of the Invention

The present invention relates to digital broadcasting, and more particularly, to a digital television signal and a method and apparatus of processing a digital television signal.

2. Discussion of the Related Art

Generally, a program and system information protocol (hereinafter, PSIP) is a protocol for channel tuning and broadcast schedule transmission in ATSC (advanced television systems committee) as the digital broadcasting standard in terrestrial and cable digital broadcasting environments. In addition, the PSIP is a standard protocol for a transfer of tables included within packets transferred by a multiplexed transport stream.

The PSIP defines many PSIP tables for the various purpose, and each PSIP table includes one or more sections which are similar to those of the program and system information (PSI) tables defined by MPEG (moving picture experts group). Each section included in a PSIP table includes a header containing basic information of the section and a body containing the actual data constituting the section. A broadcast receiver uses the basic information included in headers of various sections received from a broadcast transmitter in order to select (or detect) one or more pertinent sections, and this is often referred to as section-filtering. An example of the basic information is a table identifier which identifies a PSIP table.

However, a certain group of PSIP tables (e.g., a group of event information tables or extended text tables) have a common table identification. Therefore, the digital television (DTV) receiver is not able to distinguish them simply by section-filtering. In this case, the DTV receiver must parse bodies of the PSIP sections in order to detect a pertinent section, and this greatly increases the signal processing time and decreases the system's overall efficiency.

SUMMARY OF THE INVENTION

Accordingly, the present invention is directed to a digital television signal including a PSIP table, apparatus for receiving the same and method thereof that substantially obviate one or more problems due to limitations and disadvantages of the related art.

An object of the present invention is to provide a digital television signal in a digital television receiver.

Another object of the present invention is to provide an apparatus for decoding tables included in a digital television signal and method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television (DTV) signal for use in a DTV receiver includes an event extended text table (ETT) which includes a header and a message body. The header includes a table identification (ID) extension field which serves to establish uniqueness of the event ETT, and the message body includes an extended text message (ETM). The table ID extension field includes event identification which specifies a unique identification number of an event associated with the event ETT.

In another aspect of the present invention, a DTV signal for use in a digital television receiver includes a channel extended text table (ETT) which includes a header and a message body. The header includes a table identification (ID) extension field which serves to establish uniqueness of the channel ETT, and the message body includes an extended text message (ETM). The table ID extension field includes source identification which specifies a programming source of a virtual channel associated with the channel ETT.

In another aspect of the present invention, a digital television (DTV) receiver includes a tuner, a demodulator, and a section-filtering unit (e.g., a demultiplexer). The tuner is tuned to receive a digital television signal, and the demodulator demodulates the digital television signal. The demodulated signal includes a plurality of extended text tables (ETTs). Each ETT includes a header containing a table identification (ID) extension field which serves to establish uniqueness of each ETT. The section-filtering unit detects at least one pertinent ETT by section-filtering the plurality of ETTs using their PIDs and table ID extension fields. The DTV receiver may further include a decoder which parses the pertinent ETT detected from the section-filtering unit, and a data storage which stores an extended text message (ETM) included in the parsed ETT.

One condition for the operation of the section-filtering unit is such that the pertinent ETT has a common PID value. A first example of an additional condition for the section-filtering operation is such that a table ID extension field included in the pertinent ETT includes a specific (desired) or non-duplicative event identification. A second example of the addition condition is such that the table ID extension field includes a specific (desired) or non-duplicative source identification.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram of a general syntax of a PSIP table associated with the present invention;

FIG. 2 is an exemplary diagram of a bit stream syntax of channel ETT according to the present invention;

FIG. 3 is an exemplary diagram of a bit stream syntax of event ETT according to the present invention;

FIG. 6 illustrates a structure of a database (DB) associated with the present invention;

FIG. 10 is a flowchart illustrating a method for detecting a specific event ETT section according to the present invention.

DETAILED DESCRIPTION OF THE INVENTION

Figure 4:
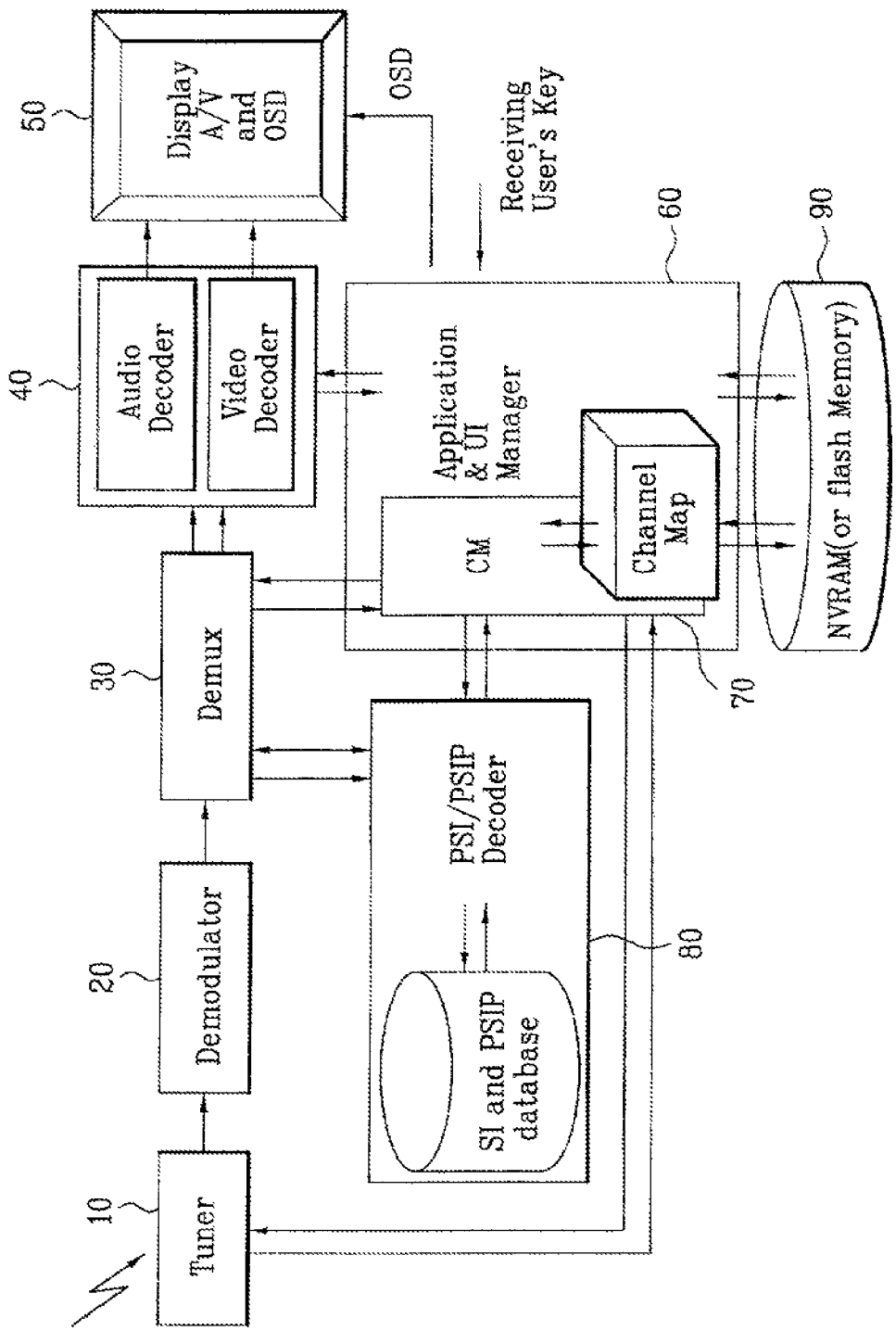
FIG. 4 is a block diagram of a digital television receiver to receive channel ETT and event ETT according to the present invention.

Reference will now be made in detail to a digital television (DTV) signal including a PSIP (Program and System Information Protocol) table and a method and apparatus of processing a DTV signal according to the preferred embodiments of the present invention, examples of which are illustrated in the accompanying drawings. Wherever possible, the same reference numbers will be used throughout the drawings to refer to the same or like parts.

First of all, terminologies used in the description of the present invention are defined as considering functions in the present invention, which are variable according to usual practice or intentions of those who skilled in the art. Hence, their definitions shall be given based on the overall contents of the present invention.

First Embodiment

The present invention relates to an ETT (extended text table) as a PSIP (Program and System Information Protocol) table included in a digital television (DTV) signal. The PSIP table is preferentially explained prior to description of the ETT.

As the PSIP table, there is a VCT (virtual channel table) having information about a virtual channel viewed by a user in a DTV receiver, an EIT (event information table) enabling an EPG (electronics program guide) service, an ETT for the EIT or the like.

The EIT contains information (titles, start times, etc) for events on defined virtual channels. The event is, in most cases, a typical TV program. Up to 128 EITs may be transmitted and each of them is referred to as EIT-k, with k=0, 1, . . . , 127. And, each EIT is represented as information of three-hour unit. Moreover, each EIT can have information about at least one event.

The ETT contains extended text message (ETM) streams, which are optional and are used to provide detailed descriptions of virtual channels (channel ETM) and events (event ETM). An ETM is a multiple string data structure, and thus, it may represent a description in several different languages.

A event ETT is mapped to each EIT. In particular, informations for events belonging to EIT-0 to EIT-127 are recorded at ETT-0 to ETT-127, respectively. In this case, information about at least one or more events included in each EIT can be represented as one section. Each of the events has a unique event identification. And, each of the events is identified by the corresponding event identification. And, ETM location indicates a presence or non-presence and a location of an ETM for each of the events.

A channel ETT is used in case that channel information having a more extended meaning is required for n-virtual channels included in one physical channel. In this case, each of the n-virtual channels defined in the VCT uses source identification in identifying each channel source. In particular, if there are n-virtual channels in one physical channel, each of the virtual channels has a source identification. In this case, the source identification should have a unique value. And, ETM location defined in VCT decides whether a channel ETT exists in each of the virtual channels. The ETM location indicates a presence or non-presence of an ETM in each of the virtual channels and a location of each of the virtual channels, which is equivalent to that of the event ETT.

Each of the channel ETTs and event ETTs can be constructed with at least one or more sections. Each of the sections includes ETM identification identifying the event or virtual channel and an extended text message (ETM) providing detailed descriptions of the event or virtual channel. In this case, the ETM identification is linked to event ETM identification of a corresponding event in case of the event ETT section or to channel ETM identification of a corresponding virtual channel in case of the channel ETT section.

Before describing about performing section-filtering, used to filter only non-duplicative or specific section, on each received ETT section, a structure of the ETT section will be first explained in detail. In this case, the section is constructed by combining data structures. The section starts from table identification field and ends to CRC 32 field.

FIG. 1 is a diagram of a general syntax of a PSIP table associated with the present invention. FIG. 2 is an exemplary diagram of a bit stream syntax of channel ETT according to the present invention, and FIG. 3 is an exemplary diagram of a bit stream syntax of event ETT according to the present invention.

A table section of the syntax shown in FIG. 1~FIG. 3 is divided into a header having a mutually common form, a message body recording actual data according to the purpose of the table section, and a trailer for an error check and correction of the table section. The header starts from table identification field to protocol version field. The message body starts from ETM identification field to extended text message field. And, the trailer is CRC 32 field.

Fields constructing the syntaxes shown in FIGS. 1 to 3 are explained as follows. For simple and clear explanation, English expression of the syntax is used as it is but is marked by double quotation marks.

First of all, each field constructing a header of the syntax is explained as follows. The "table_id" field identifies the section as belonging to an ETT and is an 8-bit field. A "section syntax indicator" field is set to '1' and is a 1-bit field. It denotes that the section follows the generic section syntax beyond the section length field. A "private_indicator" field is set to '1' and is a 1-bit field. A "section_length" field is to specify the number of remaining bytes in the section immediately following the section_length field up to the end of the section. The value of the section length field shall be no larger than 4,093.

A "table_id_extension" field is a field associated with the present invention, which will be explained later. A "version_number" field is a 5-bit field. For the channel ETT, the field indicates the version number of the channel ETT. The version number shall be incremented by 1 modulo 32 when any ETM in the channel ETT changes. For event ETT, the field indicates the version number of event ETT-i, where "i", as in the EIT case, is the index of time span. The version number shall be incremented by 1 modulo 32 when any ETM in the event ETT-j when "j" is not equal to "i". The value of this field shall be identical to that of the corresponding entry in the MGT.

A "current_next_indicator" field is a 1-bit indicator and is always set to '1' for the ETT sections. The ETT sent is always currently applicable. A "section_number" field is an 8-bit field and the value of the field shall always be '0x00'. A "last_section_number" field is an 8-bit field and the value of the field shall always be '0x00'.

A "protocol_version" field is an 8-bit unsigned integer field whose function is to allow, in the future, this table type to carry parameters that may be structured differently than those defined in the current protocol. At present, the only valid value for protocol version field is zero. Non-zero values of protocol version field may be used by a future version of this standard to indicate structurally different tables.

Secondly, fields of the message body are explained as follows. A "ETM_id" field is unique 32-bit identifier of this extended text message (ETM). The identifier follows a regular rule. By the rule, in case of channel ETM identification, source identification is written in a most significant bit (MSB) b31 and two least significant bits (LSB) b1 and b0 are written as '00'. By the rule, in case of event ETM identification, source identification is written in a most significant bit (MSB) b31, event identification is written in a bit b15, and '10' is written in least significant bits (LSB) b1 and b0. A "extended_text_message( )" field indicates the ETM in the format of a multiple string structure.

Finally, a field of the trailer is explained as follows. A "CRC_32" field is a 32-bit field that contains the CRC value that ensures a zero output from the registers in the decoder after processing the entire Transport Stream ETT section.

As mentioned in the foregoing description, the present invention performs a section-filtering on the received ETT section by filtering the header of the ETT section. For this, in the present invention, the ETT table ID extension field constructing the header of the ETT is used as followed. Namely, in case that the received ETT section is event ETT, event identification and ETM location are defined in the field to be used for the section-filtering. In case of channel ETT, source identification is defined in the field to be used for the section-filtering.

The "ETT_table_id_extension" field has a 16-bit unsigned integer value that serves to establish the uniqueness of each ETT instance when the tables appear in transport stream packets with common PID (packet identification) values. The ETT table ID extension field shall be set to a value such that separate ETT instances appearing in transport stream packets with common PID values have a unique ETT table ID extension field value. A table type of the ETT can be previously known from MGT (master guide table) before the ETT is received. In particular, the table type of the ETT is "0x0004" in case of channel ETT or "0x0200~0x027F" in case of event ETT.

FIG. 2 shows a channel ETT having an ETT table type of "0x0004". In this case, 16-bit source identification connecting the VCT to channel ETT is written in the ETT table ID extension field. And, the source identification should have the same value of source identification written in VCT and ETM identification. FIG. 3 shows an event ETT having an ETT table type of "0x0200~0x027F". In this case, the ETT table ID extension field is a 16-bit field. A E™ location field is written in two bits of the sixteen bits and unique event identification connecting the VCT to event ETT is written in fourteen bits. In this case, the event identification should have the same value of an event identification value of the corresponding event of EIT-k and an event identification value in the ETM identification should have the same value as well.

Accordingly, in the present invention, the ETT table ID extension field contains the event identification or source identification. And, by means of the ETT table ID extension field, the section-filtering is enabled with the header only without parsing a message body of each of the received ETT sections.

In doing so, by filtering the header including the ETT table ID extension field, the section-filtering can be performed in a manner that an ETT section, which was already received and is duplicative with another, is discarded and that a non-duplicative or specific section is received only.

Hence, in performing the section-filtering using the header including the ETT table ID extension field, the message body of each of the ETT sections needs not to be parsed and the DTV receiver receives the non-duplicative or specific section. Therefore, by receiving a non-duplicative ETT section or a specific ETT section, a process time can be reduced and the DTV receiver efficiency is raised.

Second Embodiment

A digital television (DTV) receiver to receive a DTV signal including an Extended Text Table (ETT) according to a second embodiment of the present invention is explained as follows.

FIG. 4 is a block diagram of a DTV receiver to receive channel ETT and event ETT according to the present invention. Referring to FIG. 4, a DTV receiver receives and processes tables according to the present invention and audio/video transport streams.

A tuner 10 receives a terrestrial or cable DTV signal via an antenna. In this case, a reception process of the tuner 10 is controlled by a channel manager 70. In particular, the tuner 10 reports a result and strength of the DTV signal received by the DTV receiver and transfers the DTV signal received by the receiver to a demodulator 20.

In case that a terrestrial broadcast is received, the demodulator 20 performs 64-VSB (vestigial sideband) or 256-VSB demodulation. In case that a cable broadcast is received, the demodulator 20 performs 64-QAM (quadrature amplitude modulation) or 256-QAM demodulation. And, the demodulator 20 transfers a demodulated signal to a demultiplexer 30.

The DTV receiver shown in FIG. 4 is divided into one part performing a section-filtering on an ETT section by a header and the other part parsing the received ETT section. In this case, the section-filtering part corresponds to the demultiplexer (DEMUX) 30 and the parsing part corresponds to a PSI/PSIP decoder 80.

First of all, the section-filtering part is explained as follows. The demultiplexer 30 performs demultiplexing to filter off audio, video and PSI/PSIP tables from transport packets transferred from the demodulator 20.

Demultiplexing of the PSI/PSIP tables is carried out under the control of the PSI/PSIP decoder 80. In particular, the demultiplexer 30 checks a header in common to the PSI/PSIP table to perform the section-filtering on the received PSI/PSIP table. And, the demultiplexer 30 generates a section of the PSI/PSIP table and then transfers it to the PSI/PSIP decoder 80. Demultiplexing of the audio/video transport packets is carried out under the control of the channel manager 70. In particular, if an audio/video packet ID (PID) of a corresponding virtual channel is set, the demultiplexer 30 demultiplexes an elementary stream of the audio/video to transfer to an audio/video decoder 40.

Hence, the demultiplexer 30 performs the section-filtering on the audio/video data, PSI/PSIP table and the like in a manner of filtering the header only. And, data for each section generated from the section-filtering is transferred to the corresponding decoder.

The corresponding decoder is explained as follows. The audio/video decoder 40 decodes elementary stream packets of audio/video transferred from the demultiplexer 30 by MPEG2/AC3. The audio/video decoder 40 synchronizes the decoded audio/video data by a VDP (video player processor) and then transfers it to an output unit, i.e., an A/V & OSD (on screen display) displayer 50.

The A/V & OSD displayer 50 receives the decoded audio/video data transferred from the audio/video decoder 40 and then displays the received audio/video data via screen/speaker. In this case, the A/V & OSD displayer 50 is under the control of OSD graphic data in case of displaying the data via the screen.

In case that there is a key input of a viewer watching the DTV, an application & UI (user interface) manager 60 responds to a viewer's request by displaying it on the screen via a graphic user interface.

The application & UI manager 60 receives a decoded state of the audio/video signal from the audio/video decoder 40 and then controls the displayer 50 via the OSD according to the received audio/video state. And, the application & UI manager 60 controls the channel manager 70 to perform channel associated management, i.e., channel map management and to manage the PSI/PSIP decoder 80. Moreover, the application & UI manager 60 stores/restores GUI control of the entire DTV receiver, user's request and a state of the DTV receiver in/from a NVRAM (or flash memory) 90. Furthermore, the application & UI manager 60 includes the channel manager 70. The channel manager 70 manages the channel map by controlling the tuner 10 and the PSI/PSIP decoder 80 to meet a channel request made by a viewer.

The channel manager 70 requests the PSI/PSIP decoder 80 to parse a table associated with a channel to be tuned and receives a report of parsing the table from the PSI/PSIP decoder 80. The channel manager 70 updates the channel map according to the reported parsing result and makes a decoding request by setting the audio/video packet ID in the demultiplexer 30.

Meanwhile, the PSI/PSIP decoder 80 corresponding to the table parsing part is explained as follows. The PSI/PSIP decoder 80, which is a PSI and PSIP control module, performs a slave operation under the control of the channel manager 70. Namely, the PSI/PSIP decoder 80 sets PIDs of the PSI/PSIP tables in the demultiplexer 30. The PSI/PSIP decoder 80 receives and parses the PSI section for an MPEG2 system and generates a PSI database. And, the PSI/PSIP decoder 80 receives and parses the PSIP section for ATSC and generates a SI/PSIP database. In performing a parsing, the PSI/PSIP decoder 80 reads a rest actual section data portion, on which the section-filtering is not performed or cannot be performed, and then records it in the SI/PSIP database.

Third Embodiment

A method of performing a section-filtering by filtering a header of a received ETT (Extended Text Table) section only according to another embodiment of the present invention is explained as follows. Specifically, in performing the section-filtering, a method of checking and handling ETT table ID extension field included in a header of a received ETT section is explained as follows.

Figure 5:
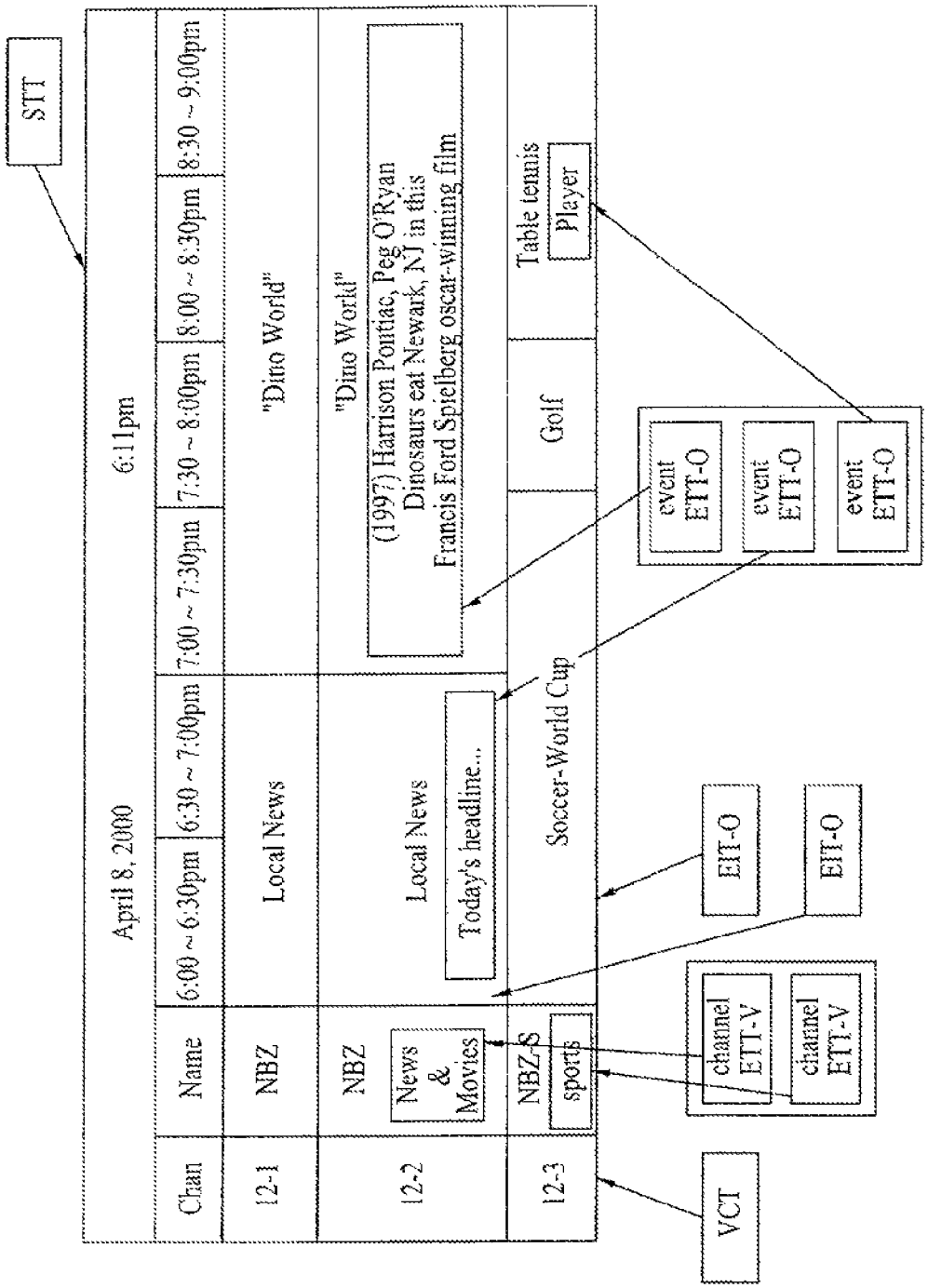
FIG. 5 illustrates an EPG display according to one embodiment of the present invention.

An EPG (Electronic Program Guide) is preferentially explained prior to the embodiment. FIG. 5 illustrates an EPG display according to one embodiment of the present invention. Referring to FIG. 5, an EPG includes VCT (Virtual Channel Table), channel ETT, EIT (Event Information Table) and event ETT.

Information of a current date and time at a most upper end on an EPG screen is delivered via STT (System Time Table) and exemplarily shows "April 8, 2000 6:11 pm".

A most left side "Chan" part in FIG. 5 displays channel numbers 12-1, 12-2 and 12-3 of virtual channels delivered from VCT. In this case, each of the virtual channels has source identification having a unique value. A name part follows each of the channels. The name part means a channel short name included in each of the virtual channels and exemplarily shows NBZ1, NBZ2 or NBZ-S. Each of the virtual channels can send a channel information message having a more extended meaning, which is forwarded via channel ETT-V for each of the virtual channels connected to the source identification obtained from the VCT.

Although the channel 12-1 is represented as the name "NBZ1", channel ETT connected to the source identification of the channel does not exist. A channel ETT called "News & Movies" exists in the channel 12-2 and channel ETT called "sports" exists in the channel 12-3. In this case, instances of the two channel ETTs has the same PID (Packet IDentification) and is represented as ETT-V. And, each instance of the channel ETTs has the same table type, version number, table identification and the like.

In the channel 12-1, an event having a title of "Local News" at 6:00~7:00 pm and an event having a title of "Dino World" at 7:00~9:00 pm exist as broadcast programs. This information is delivered via EIT-0 table having the same value of source identification of a virtual channel 12-1.

In the channel 12-2, an event having a title of "Local News" at 6:00~7:00 pm and an event having a title of "Dino World" at 7:00~9:00 pm exist as broadcast programs. This information is delivered via EIT-0 table having the same value of source identification of a virtual channel 12-2. In this case, it is exemplarily shown that each of the events in the channel 12-2 includes a broadcast content message having a more extended content. This is forwarded via event ETT. In the former event, event ETT for the event named "Today's headline . . ." exists. In the latter event, event ETT named "(1997) Harrison Pontiac, Peg O'Ryan Dinosaurs eat Newark, N.J. in the Francis Ford Spielberg oscar-winning film" exists.

In the channel 12-3, an event having a title of "Soccer—World Cup" at 6:00~7:30 pm, an event having a title of "Golf" at 7:30~8:00 pm, and an event (EIT-0) having a title of "Table Tennis" at 8:00~9:00 pm exist as broadcast programs. These events are delivered via EIT-0 table having the same value of source identification of a virtual channel 12-3. In this case, it is shown that event ETT (event ETT-v) to forward a broadcast content message having an extended content named "Player" exists in the event having the title named "Table Tennis".

Hence, in FIG. 5, there exist three event ETTs to forward the broadcast content messages having the extended contents for several events. Each of the event ETTs has the same values of PID, version number, table identification and table type. As can be seen in FIG. 5, if the number of the virtual channels is raised, the number of the instances of the duplicative channel ETTs and event ETTs will be increased as well.

As mentioned in the above description of the EPG, the present invention intends to perform a section-filtering on the numerous duplicative channel ETTs and event ETTs to receive a non-duplicative ETT section or a specific section only instead of receiving an ETT section duplicative with a previously received one. In case that a content of the channel ETT is changed (e.g., the version number is changed), one channel ETT that is changed in the above manner can be quickly received.

FIG. 6 illustrates a structure of a database (DB) associated with the present invention. Referring to FIG. 6, source identification and event identification required for receiving channel ETT and event ETT are stored in a database (DB). The database (DB) shown in FIG. 6 includes a part storing the source identification linking VCT and the channel ETT together and a part storing the event identification linking EIT and the event ETT together.

The source identification, as shown in FIG. 6, is represented as "source_id_(A~Z)". In this case, the "A~Z" corresponds to a virtual channel to represent the source identification existing in each of the channels A to Z existing within the VCT. The event identification is represented as "event_id_(A1~An) to (Z1~Zn)". In this case, the "A~Z" corresponds to a virtual channel and the "1~n" indicates an event existing in each of the virtual channels. Namely, it means that an event corresponding to A1~An exists in the virtual channel A.

A process for performing a section-filtering in a manner of filtering a header of an ETT section received by a receiver according to the present invention is explained as follows. As mentioned in the foregoing description, there exist channel ETT and event ETT, which will be individually explained in the following description.

First of all, in performing the section-filtering, a DTV is turned on. A specific channel is previously selected in the DTV. A DTV receiver receives channel information via VCT, PAT (Program Association Table) or PMT (Program Map Table). And, the DTV receiver sets an A/V PID of a specific virtual channel determined by a viewer to the demultiplexer 30. Hence, the viewer watches the specific virtual channel. In the present invention, it is assumed that the viewer requests ETT information of the currently watched specific virtual channel. If a request for the ETT information is made, a section-filtering is initiated by filtering a header only according to the present invention.

As mentioned in the foregoing description, the section-filtering includes one case of receiving a non-duplicative ETT section only by discarding an ETT section duplicative with a previously received one and the other case of receiving a specific ETT section only. Moreover, a concept of the section-filtering may include a case of combining the former two cases together. In the following description of the present invention, theses three cases will be taken as examples in the present invention.

Figure 7:
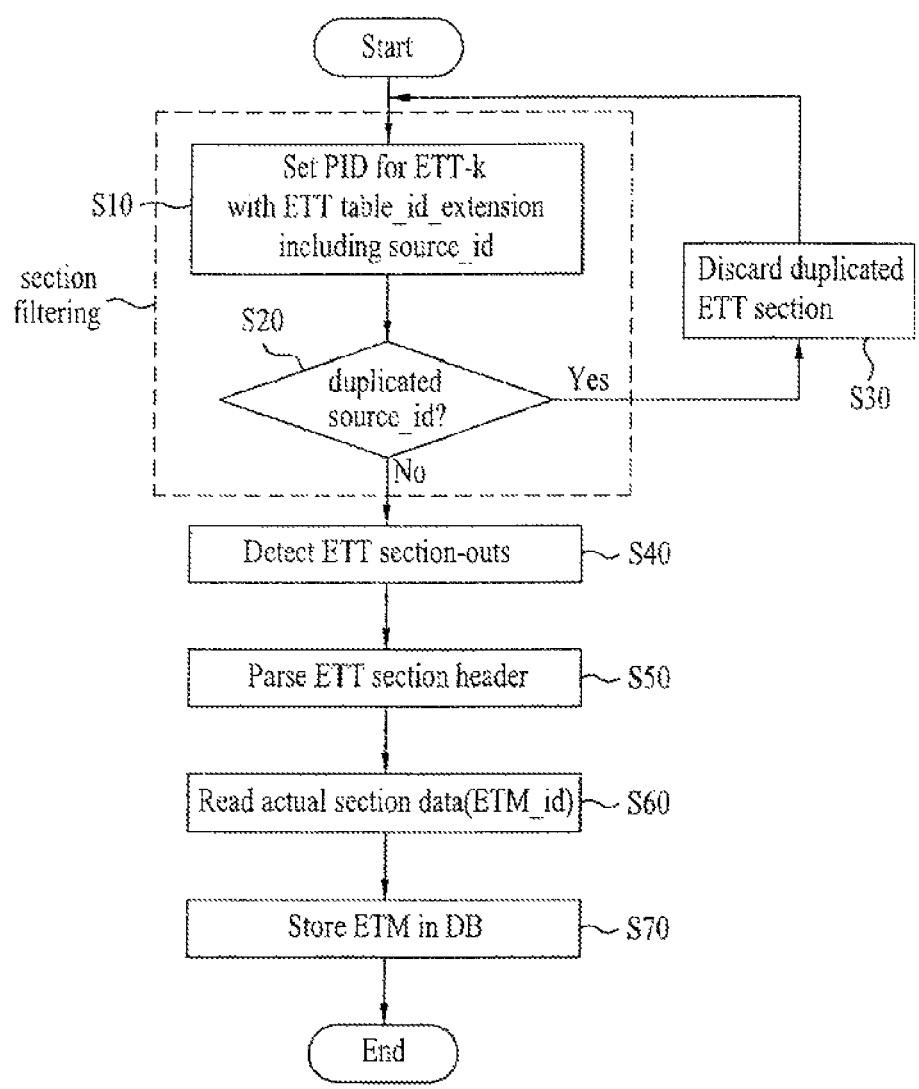
FIG. 7 is a flowchart illustrating a method for detecting a non-duplicative channel ETT section according to the present invention.

First of all, the case of receiving a non-duplicative ETT section only by discarding an ETT section duplicative with a previously received one is explained as follows. FIG. 7 is a flowchart illustrating a method for detecting a non-duplicative channel ETT section according to the present invention.

Referring to FIG. 7, if a user requests information of ETT, the PSI/PSIP decoder 80 controls the demultiplexer 30 to perform a section-filtering by a header. Namely, the PSI/PSIP decoder 80 sets a condition for the section-filtering in the demultiplexer 30. The demultiplexer 30 then filters the header according to the set condition. In particular, a corresponding PID is assigned to the audio/video or data service using a table type acquired from the MGT and an ETT section having the assigned PID is received only. In doing so, a condition for receiving a section including ETT table ID extension field having source identification recorded therein only is applied to the received ETT section having met the former condition.

Thus, the DTV receiver performs the section-filtering through the two conditions. Hence, the DTV receiver receives the channel ETT section that meets the two conditions only (S10).

The source identification recorded in ETT table ID extension field of the channel ETT section, which has met the conditions and is received by the DTV receiver, is read out. It is then decided whether the read-out source identification is equal to source identification stored in a database (DB). In particular, it is decided whether the source identification recorded in the ETT table ID extension field of the received channel ETT section is equal to, i.e., duplicative with the source identification, which was generated from decoding VCT, stored in the database (DB) (S20).

As a result of the decision (S20), if the two source identification's are equal to each other, it is decided that the received channel ETT section is duplicative with a previously received section. Hence, the duplicative channel ETT section is discarded. And, it goes back to the first step to receive a non-duplicative channel ETT section (S30).

As a result of the decision (S20), if the two source identification's are not equal to each other, it is decided that the received channel ETT section is a non-duplicative channel ETT section instead of being duplicative with a previously received section. And, it goes to a next step. So, the section-filtering process by the header in the demultiplexer 30 is completed. Hence, the above-explained steps S10 to S30 correspond to the explanation of the section-filtering by filtering the header in the demultiplexer 30 controlled by the PSI/PSIP decoder 80.

A process for parsing and processing the channel ETT sections received through the section-filtering is explained as follows. In this case, the parsing is performed by the PSI/PSIP decoder 80.

First of all, as a result of the decision (S20), if the two source identification's are not equal to each other, it is decided that the received channel ETT section is not an duplicative channel ETT section but a non-duplicative channel ETT section. The PSI/PSIP decoder 80 then detects a channel ETT section-out received via the demultiplexer 30 (S40). The PSI/PSIP decoder 80 parses a header of the detected channel ETT section again (S50).

And, the PSI/PSIP decoder 80 reads out ETM identification, which is actual section data, by parsing a message body of the channel ETT section (S60). An ETM (extended text message) is then stored in the database (DB) (S70).

Through the above-explained processes, one channel ETT section is processed or handled. If there exists another channel ETT section that is not received yet, the above-explained processes are repeated.

Figure 8:
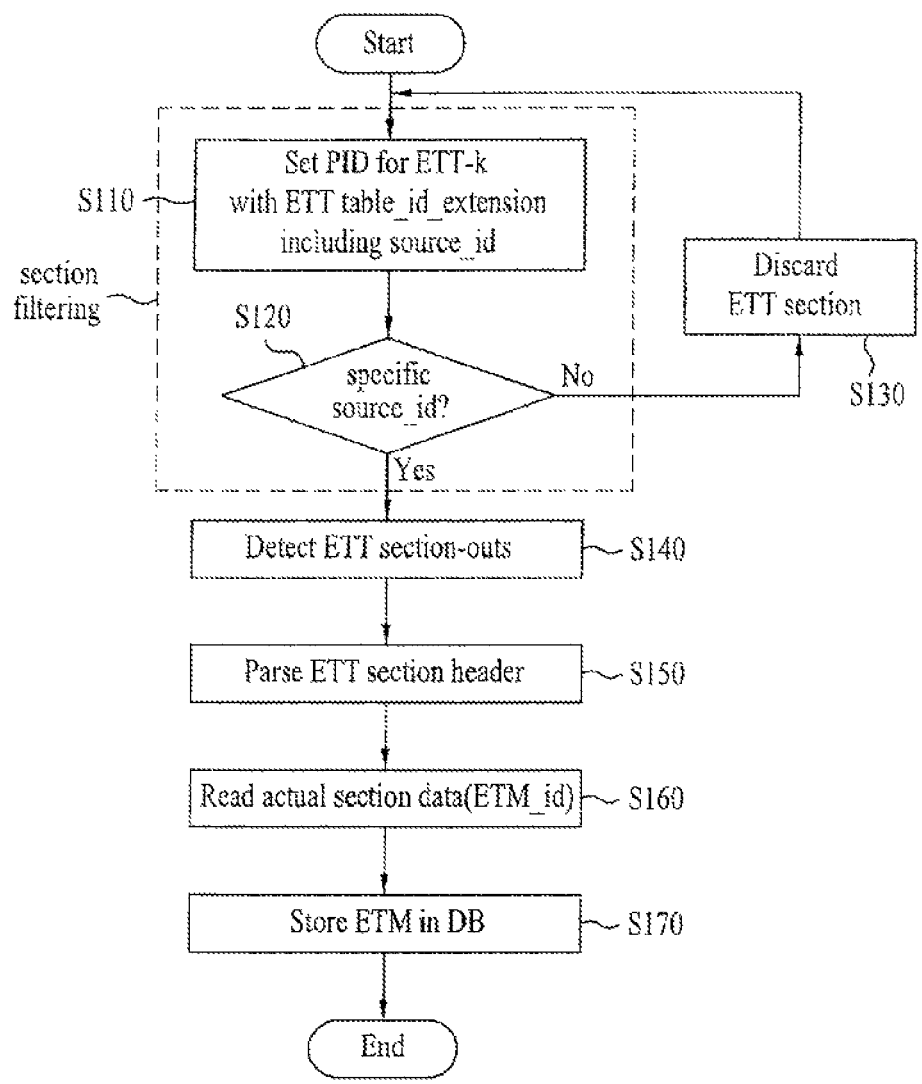
FIG. 8 is a flowchart illustrating a method for detecting a specific channel ETT section according to the present invention.

FIG. 8 is a flowchart illustrating a method for detecting a specific channel ETT section according to the present invention. A process for receiving a specific channel ETT section is basically identical to the process explained in FIG. 7. For convenience of explanation, a section-filtering part different from that of the process of FIG. 7 is explained only and the rest part will refer to the process of FIG. 7.

First of all, a corresponding PID is assigned to the audio/video or data service using a table type acquired from the MGT and an ETT section having the assigned PID is received only. In doing so, a condition for receiving a section including ETT table ID extension field having source identification recorded therein only is applied to the received ETT section having met the former condition. Thus, the DTV receiver performs the section-filtering through the two conditions. Hence, the DTV receiver receives the channel ETT section that meets the two conditions only (S110).

The source identification recorded in ETT table ID extension field of the channel ETT section, which has met the conditions and is received by the DTV receiver, is read out. It is then decided whether the read-out source identification is equal to source identification stored in a database (DB). In particular, it is decided whether the source identification recorded in the ETT table ID extension field of the received channel ETT section is equal to the source identification, which was generated from decoding VCT, stored in the DB (S120).

As a result of the decision (S120), if the two source identification's are not equal to each other, it is decided that the received channel ETT section is not a specific channel ETT section. Hence, the received channel ETT section is discarded (S130).

As a result of the decision (S20), if the two source identification's are equal to each other, it is decided that the received channel ETT section is the specific channel ETT section. And, it goes to a next step. So, the section-filtering process in the demultiplexer 30 is completed. A parsing and handling process in the PSI/PSIP decoder 80 is equal to the process explained in FIG. 7, which is invoked in this description. Namely, steps S140 to S170 in FIG. 8 exactly correspond to the steps S40 to S70 in FIG. 7.

Figure 9:
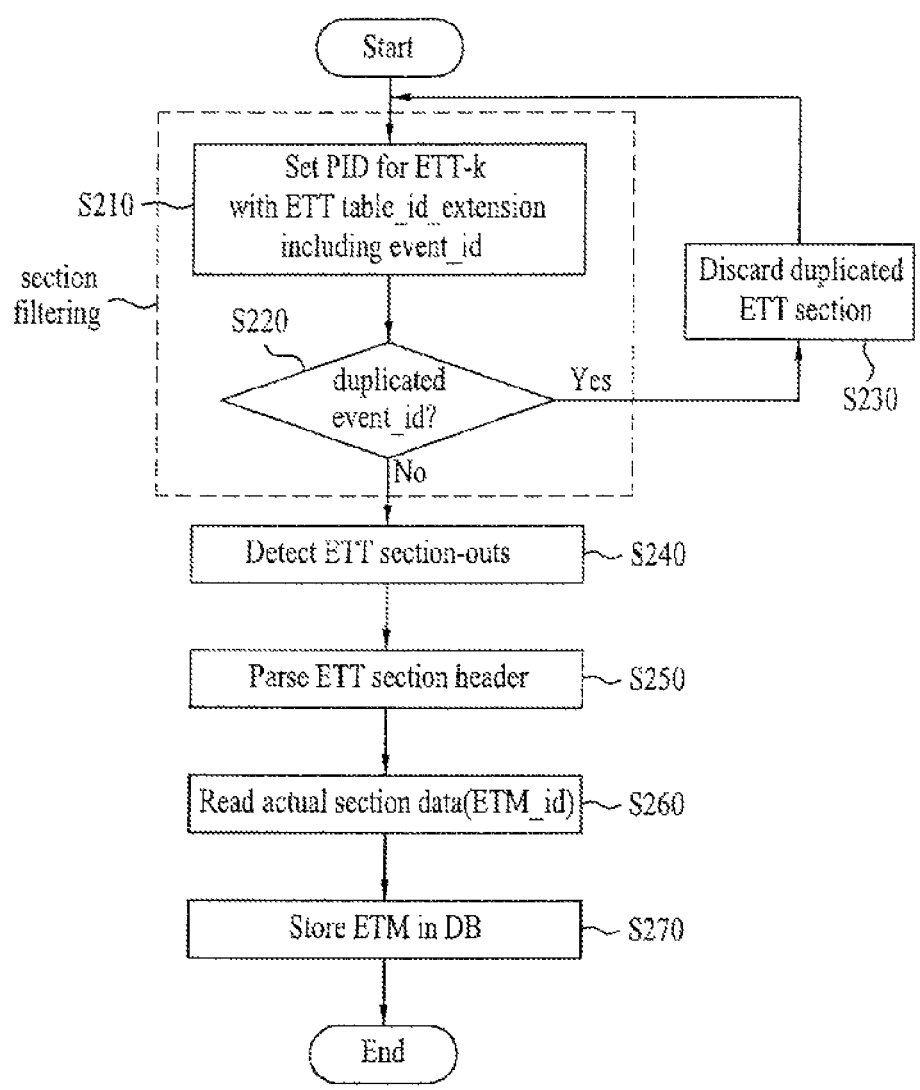
FIG. 9 is a flowchart illustrating a method for detecting a non-duplicative event ETT section according to the present invention.

The event ETT is explained in the following description. FIG. 9 is a flowchart illustrating a method for detecting a non-duplicative event ETT section according to the present invention.

Referring to FIG. 9, a corresponding PID is assigned using a table type acquired from the MGT and an event ETT section having the assigned PID is received only. In doing so, a condition for receiving a section including ETT table ID extension field having event identification recorded therein only is applied to the received event ETT section having met the former condition. Thus, the DTV receiver performs the section-filtering through the two conditions. Hence, the DTV receiver receives the event ETT section that meets the two conditions only (S210).

The event identification recorded in ETT table ID extension field of the event ETT section, which has met the conditions and is received by the DTV receiver, is read out. It is then decided whether the read-out event identification is equal to event identification stored in a database (DB). In particular, it is decided whether the event identification recorded in the ETT table ID extension field of the received event ETT section is equal to, i.e., duplicative with the event identification, which was generated from decoding VCT, stored in the database (DB) (S220).

As a result of the decision (S220), if the two event identification's are equal to each other, it is decided that the received event ETT section is duplicative with a previously received section. Hence, the duplicative event ETT section is discarded. And, it goes back to the first step to receive a non-duplicative event ETT section (S230).

As a result of the decision (S220), if the two source identification's are not equal to each other, it is decided that the received event ETT section is a non-duplicative event ETT section instead of being duplicative with a previously received section. And, it goes to a next step. So, the section-filtering process in the demultiplexer controlled by the PSI/PSIP decoder 80 is completed. A process for parsing and processing the event ETT section received through the section-filtering is explained as follows. In this case, the parsing is performed by the PSI/PSIP decoder 80.

First of all, as a result of the decision (S220), if the two event identification's are not equal to each other, it is decided that the received event ETT section is not an duplicative event ETT section but a non-duplicative event ETT section. The PSI/PSIP decoder 80 then detects an event ETT section-out received via the demultiplexer 30 (S240). The PSI/PSIP decoder 80 parses a header of the detected event ETT section again (S250).

And, the PSI/PSIP decoder 80 reads out ETM identification, which is actual section data, by parsing a message body of the parsed event ETT section (S260). An ETM (extended text message) is then stored in the DB (S270).

Through the above-explained processes, one event ETT section is processed or handled. If there exists another event ETT section that is not received yet, the above-explained processes are repeated.

FIG. 10 is a flowchart illustrating a method for detecting a specific event ETT section according to the present invention. A process for receiving a specific event ETT section is basically identical to the process explained in FIG. 9. For convenience of explanation, a section-filtering part different from that of the process of FIG. 9 is explained only and the rest part will refer to the process of FIG. 9.

First of all, a corresponding PID is assigned using a table type acquired from the MGT and an event ETT section having the assigned PID is received only. In doing so, a condition for receiving a section including ETT table ID extension field having event identification recorded therein only is applied to the received event ETT section having met the former condition. Thus, the DTV receiver performs the section-filtering through the two conditions. Hence, the DTV receiver receives the event ETT section that meets the two conditions only (S310).

The event identification recorded in ETT table ID extension field of the event ETT section, which has met the conditions and is received by the DTV receiver, is read out. It is then decided whether the read-out event identification is equal to event identification stored in a database (DB). In particular, it is decided whether the event identification recorded in the ETT table ID extension field of the received event ETT section is equal to the event identification, which was generated from decoding VCT, stored in the DB (S320).

As a result of the decision (S320), if the two event identification's are not equal to each other, it is decided that the received event ETT section is not a specific event ETT section. Hence, the received event ETT section is discarded. And, it goes back to the first step to receive a specific event ETT section (S330).

As a result of the decision (S320), if the two source identification's are equal to each other, it is decided that the received event ETT section is the specific event ETT section. And, it goes to a next step. So, the process for performing the section-filtering in a manner of filtering the header in the demultiplexer 30 controlled by the PSI/PSIP decoder 80 is completed.

A process for parsing and handling the event ETT section received through the section-filtering is equal to the process explained in FIG. 9. Namely, steps S340 to S370 in FIG. 10 exactly correspond to the steps S240 to S270 in FIG. 9.

In the above-explained embodiment, the source identification or event identification of the specific ETT section is stored in the DB in receiving the specific channel ETT section or event ETT section. Yet, the present invention does not put limitation on this.

Hence, in performing the section-filtering to receive the specific ETT section only, the source identification or event identification assigned to the specific ETT section is compared to the other source identification or event identification specified in the ETT table ID extension field of the received ETT section.

Moreover, in performing the section-filtering to receive the specific ETT section only, the specific section among the received ETT sections can be only received by receiving non-duplicative ETT sections by discarding a received section that is not the specific section. Or, in performing the section-filtering to receive the non-duplicative ETT section only, the duplicative section(s) among the received ETT sections can be discarded. And, the DTV receiver is received the non-duplicative ETT sections only. It can be then decided whether the non-duplicative ETT section is equal to the specific ETT section.

Namely, in case that the received ETT section is not the specific ETT section in FIG. 10, it can be decided whether the received ETT section is the non-duplicative ETT section like FIG. 9. Or in case that the received ETT section is the non-duplicative ETT section in FIG. 9, it can be decided whether the received ETT section is the specific ETT section like FIG. 10.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a digital television (DTV) signal in a DTV receiver, the method comprising:
receiving a digital television signal including a plurality of extended text table (ETT) instances that appear in transport stream packets with common PID values, the ETT instances having common table ID values, each ETT instance comprising a section header and a message body, the section header containing a table identification (ID) extension field that serves to establish uniqueness of each ETT instance, the message body containing an extended text message (ETM) which provides detailed descriptions of a virtual channel or an event associated with each ETT instance, wherein the section header further contains a current next indicator field and a last section number field indicating a last section number;
demodulating the digital television signal; and
identifying at least one pertinent ETT instance from the plurality of ETT instances.

2. The method of claim 1, wherein the current next indicator field is a 1-bit field and the last section number field is an 8-bit field.

3. The method of claim 1, wherein the table ID extension field defines a value indicating an event identifier (ID) associated with each ETT instance.

4. The method of claim 2, wherein the table ID extension field further defines a value indicating an ETM location.

5. The method of claim 1, wherein the table ID extension field has a 16-bit integer value.

6. The method of claim 1, wherein the plurality of ETT instances are section-filtered based on a condition that the at least one pertinent ETT instance has a specific PID value.

7. The method of claim 1, wherein the plurality of ETT instances are section-filtered based on a condition that the table ID extension field included in the at least one pertinent ETT instance includes a specific value.

8. The method of claim 7, wherein the specific value specifies a unique identification number of an event associated with the at least one pertinent event ETT instance.

9. The method of claim 1, wherein the plurality of ETT instances are section-filtered based on a condition that the table ID extension field included in the at least one pertinent ETT instance includes a non-duplicative event identifier.

10. The method of claim 1, further comprising:
parsing the identified at least one pertinent ETT instance; and
storing the extended text message (ETM) included in the parsed ETT instance.

11. A method of processing a digital television (DTV) signal in a DTV transmitter, the method comprising:
generating a plurality of extended text table (ETT) instances that appear in transport stream packets with common PID values, the ETT instances having common table ID values, each ETT instance comprising a section header and a message body, the section header containing a table identification (ID) extension field that serves to establish uniqueness of each ETT instance, the message body containing an extended text message (ETM) which provides detailed descriptions of a virtual channel or an event associated with each ETT instance, wherein the section header further contains a current next indicator field and a last section number field indicating a last section number;
multiplexing the ETT instances and audio and video (AV) data; and
transmitting a DTV signal including the multiplexed ETT instances and AV data.

12. The method of claim 11, wherein the current next indicator field is a 1-bit field and the last section number field is an 8-bit field.

13. The method of claim 11, wherein the table ID extension field defines a value indicating an event identifier (ID) associated with each ETT instance.

14. The method of claim 13, wherein the table ID extension field further defines a value indicating an ETM location.

15. The method of claim 11, wherein the table ID extension field has a 16-bit integer value.

16. The method of claim 11, wherein the plurality of ETT instances are section-filtered based on a condition that at least one pertinent ETT instance has a specific PID value.

17. The method of claim 11, wherein the plurality of ETT instances are section-filtered based on a condition that the table ID extension field included in at least one pertinent ETT instance includes a specific value.

18. The method of claim 17, wherein the specific value specifies a unique identification number of an event associated with the at least one pertinent ETT instance.

19. The method of claim 11, wherein the plurality of ETT instances are section-filtered based on a condition that the table ID extension field included in at least one pertinent ETT instance includes a non-duplicative event identifier.

20. The method of claim 11, further comprising:
multiplexing at least one pertinent ETT instance; and
transmitting the extended text message (ETM) included in the multiplexed ETT instance.

* * * * *